United States Patent
Chen

(10) Patent No.: US 11,952,078 B2
(45) Date of Patent: Apr. 9, 2024

(54) DRIVING DEVICE AND DRIVING METHOD FOR ELECTRIC ASSISTED BICYCLE

(71) Applicant: Acer Incorporated, New Taipei (TW)

(72) Inventor: Hao-Ming Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 443 days.

(21) Appl. No.: 17/308,051

(22) Filed: May 5, 2021

(65) Prior Publication Data

US 2022/0306238 A1 Sep. 29, 2022

(30) Foreign Application Priority Data

Mar. 25, 2021 (TW) .................... 110110803

(51) Int. Cl.
*B62M 6/50* (2010.01)
*B62J 45/411* (2020.01)
*B62J 45/412* (2020.01)

(52) U.S. Cl.
CPC .............. *B62M 6/50* (2013.01); *B62J 45/411* (2020.02); *B62J 45/412* (2020.02)

(58) Field of Classification Search
CPC ........ B62J 45/411; B62J 45/412; B62M 6/45; B62M 6/50
See application file for complete search history.

(56) References Cited

U.S. PATENT DOCUMENTS

| | | | | |
|---|---|---|---|---|
| 8,047,131 | B2 * | 11/2011 | Onishi ............... | B30B 1/266 100/48 |
| 10,035,560 | B2 * | 7/2018 | Miyoshi .................. | B62K 23/02 |
| 2013/0311019 | A1 * | 11/2013 | Tanaka ..................... | B62M 6/45 701/22 |

FOREIGN PATENT DOCUMENTS

| | | |
|---|---|---|
| AU | 2009100700 | 9/2009 |
| CA | 2836456 | 6/2014 |
| CN | 1715134 | 1/2006 |
| CN | 201777370 | 3/2011 |
| CN | 202175158 | 3/2012 |
| CN | 102464080 | 5/2012 |
| CN | 103732487 | 4/2014 |
| CN | 104108452 | 10/2014 |
| CN | 205769945 | 12/2016 |
| CN | 106515984 | 3/2017 |
| CN | 206231551 | 6/2017 |
| CN | 108725682 | 11/2018 |
| CN | 109606528 | 4/2019 |
| CN | 109941390 | 6/2019 |
| CN | 112046672 | 12/2020 |
| CN | 112407133 | 2/2021 |

(Continued)

OTHER PUBLICATIONS

"Search Report of Europe Counterpart Application", dated Dec. 20, 2021, p. 1-p. 9.

*Primary Examiner* — Babar Sarwar

(74) *Attorney, Agent, or Firm* — JCIPRNET

(57) ABSTRACT

A driving device and a driving method for an electric assisted bicycle are provided. The driving device includes a motor, a rotation speed sensor, a torque sensor and a controller. The rotation speed sensor senses a rotation speed value of a crank or a chainring of the electric assisted bicycle. The torque sensor obtains an average torque value applied by the crank to the chainring of the electric assisted bicycle. The controller controls an output of the motor in response to the rotation speed value and the average torque value.

14 Claims, 4 Drawing Sheets

(56) References Cited

FOREIGN PATENT DOCUMENTS

| | | | | |
|---|---|---|---|---|
| CN | 107298151 B | * | 4/2021 | ............ B60W 10/08 |
| CN | 110552164 B | * | 3/2022 | ............ D06F 37/304 |
| DE | 102014206818 | | 10/2015 | |
| DE | 102014206818 A1 | * | 10/2015 | ............. B62M 6/45 |
| DE | 102019131197 | | 5/2020 | |
| JP | H10194185 | | 7/1998 | |
| JP | 2014023185 A | * | 2/2014 | |
| JP | 2016168894 A | * | 9/2016 | |
| JP | 6460851 | | 1/2019 | |
| JP | 2020142732 | | 9/2020 | |
| TW | 201347500 | | 11/2013 | |
| TW | 201444314 | | 11/2014 | |
| TW | I478845 | | 4/2015 | |
| TW | M530282 | | 10/2016 | |
| TW | 201640396 | | 11/2016 | |
| WO | WO-2019189285 A1 | * | 10/2019 | |
| WO | WO-2021116353 A1 | * | 6/2021 | ............ B62J 45/413 |

* cited by examiner

DRIVING DEVICE AND DRIVING METHOD FOR ELECTRIC ASSISTED BICYCLE

CROSS-REFERENCE TO RELATED APPLICATION

This application claims the priority benefit of Taiwan application serial no. 110110803, filed on Mar. 25, 2021. The entirety of the above-mentioned patent application is hereby incorporated by reference herein and made a part of this specification.

BACKGROUND

Technical Field

The disclosure relates to a driving device and a driving method, and more particularly, to a driving device and a driving method for an electric assisted bicycle.

Description of Related Art

With the rising awareness of environmental protection, the number of people riding bicycles is increasing. Electric assisted bicycles are getting more and more popular because they are less laborious to ride due to the electric power assistance. The driving method for the current electric assisted bicycle drives the electric assisted bicycle substantially according to one of the speed, pedaling torque, and throttle output.

However, the current electric assisted bicycles in the market only directly control the output of the motor according to the value of one of the speed, pedaling torque and throttle output, and do not further process and analyze the values. Therefore, the current electric assisted bicycles do not easily meet the riding requirements of the user. As a result, the riding experience is uncomfortable.

SUMMARY

The disclosure provides a driving device and a driving method for an electric assisted bicycle, which may provide a more comfortable riding experience in different riding scenarios.

A driving device in the disclosure is suitable for an electric assisted bicycle. The driving device includes a motor, a rotation speed sensor, a torque sensor, and a controller. The motor provides a driving torque required by the electric assisted bicycle to move forward. The rotation speed sensor senses a rotation speed value of one of a crank and a chainring of the electric assisted bicycle. The torque sensor obtains an average torque value applied by the crank to the chainring of the electric assisted bicycle. The controller is coupled to the motor, the rotation speed sensor, and the torque sensor. The controller controls an output of the motor in response to the rotation speed value and the average torque value.

A driving method in the disclosure is suitable for an electric assisted bicycle. The electric assisted bicycle includes a chainring, a crank, and a motor. The driving method includes the following steps. A rotation speed value of one of the crank and the chainring is sensed by a rotation speed sensor, and an average torque value applied by the crank to the chainring is obtained by a torque sensor. An output of the motor is controlled in response to the rotation speed value and the average torque value.

Based on the above, the driving device and the driving method in the disclosure control the output of the motor in response to the rotation speed value and the average torque value. Therefore, the driving device and the driving method in the disclosure may provide a more comfortable riding experience in the different riding scenarios.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
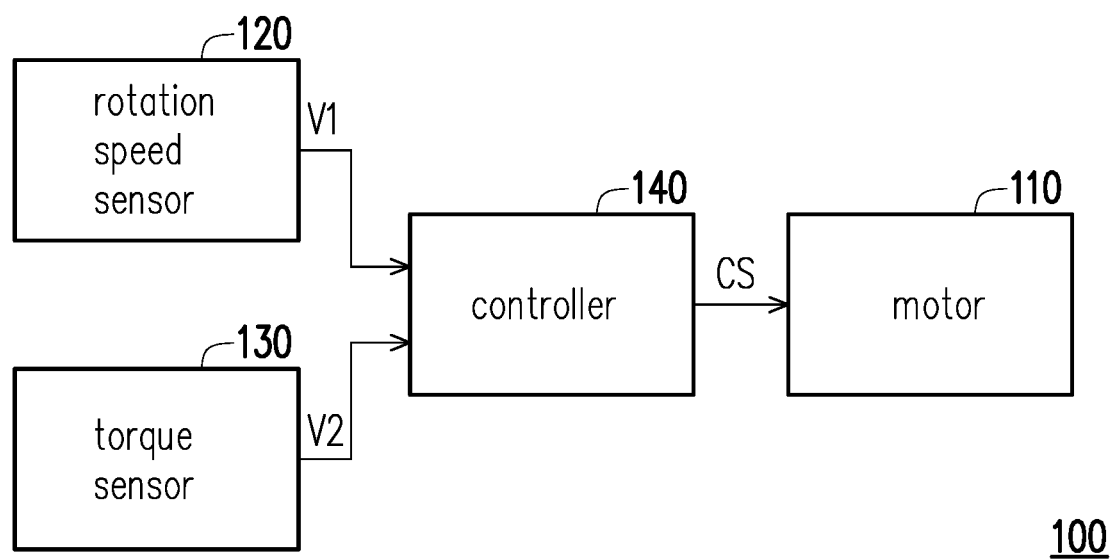
FIG. 1 is a schematic view of a driving device according to an embodiment of the disclosure.

Part of the embodiments of the disclosure will be described in detail with the accompanying drawings. Wherever possible, the same reference numbers are used in the drawings and the description to refer to the same or like parts. The embodiments are only a part of the disclosure, and do not disclose all the possible implementation methods of the disclosure. More precisely, the embodiments are just examples in the scope of the patent application of the disclosure.

Figure 2:
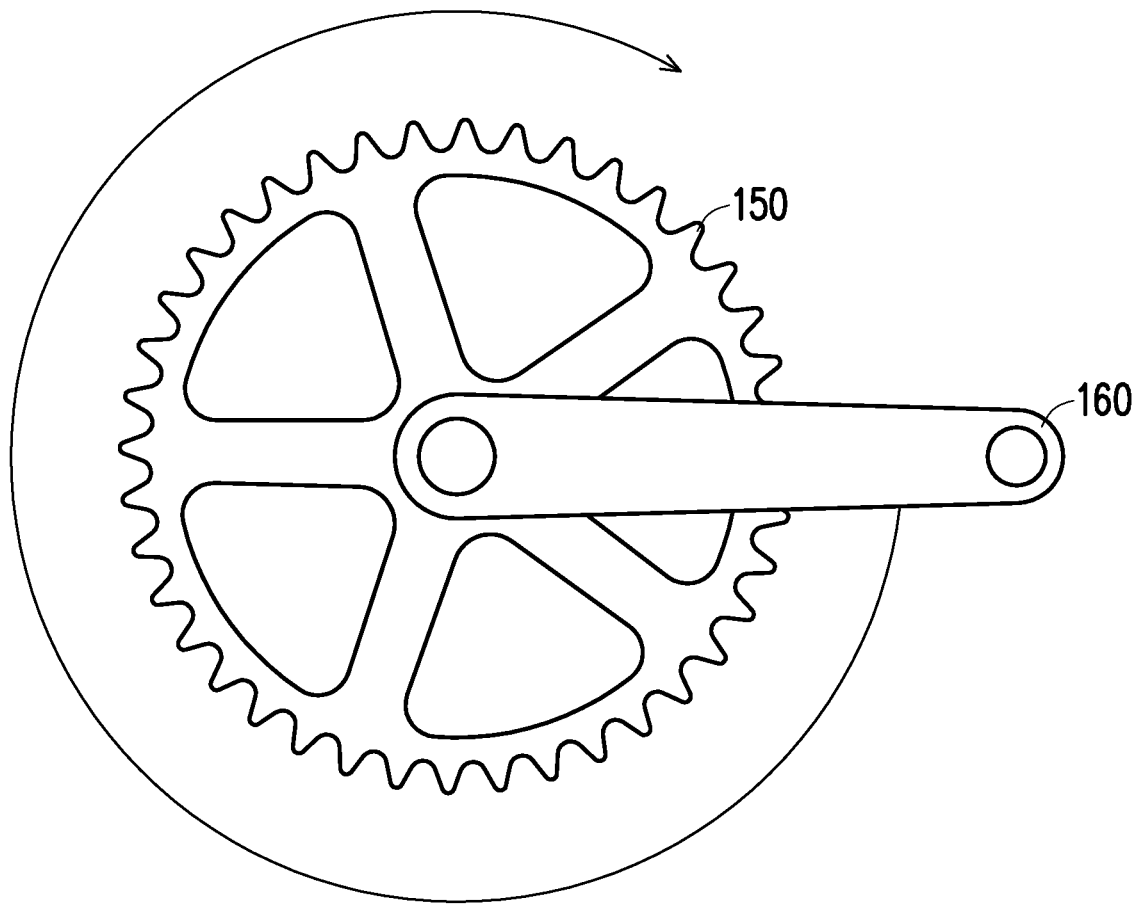
FIG. 2 is a schematic view of a motion of a crank according to an embodiment of the disclosure.

Referring to FIGS. 1 and 2, FIG. 1 is a schematic view of a driving device according to an embodiment of the disclosure. FIG. 2 is a schematic view of a motion of a crank according to an embodiment of the disclosure. In this embodiment, a driving device 100 is suitable for an electric assisted bicycle. The driving device 100 is disposed on the electric assisted bicycle. The driving device 100 includes a motor 110, a rotation speed sensor 120, a torque sensor 130, and a controller 140. The motor 110 is configured to provide a driving torque required by the electric assisted bicycle to move forward, so as to drive at least one wheel of the electric assisted bicycle.

In this embodiment, the rotation speed sensor 120 senses a rotation speed value V1 of a crank 160. The torque sensor 130 obtains an average torque value V2 applied by the crank 160 to a chainring 150 of the electric assisted bicycle. The average torque value V2 is related to a pedaling force of a user. It should be noted that based on a direction of the crank 160 and a way the user applies force, a torque value generated by the crank 160 is not the same. For example, the torque value provided when the crank 160 is vertical is significantly less than the torque value provided when the crank 160 is horizontal. Therefore, in this embodiment, the torque sensor 130 senses multiple torque values when the crank 160 makes one revolution, and records the torque values. Next, the torque sensor 130 averages the torque values to obtain the average torque value V2. For example, when the crank 160 makes one revolution, the torque sensor 130 records the torque values for every 90° rotation of the crank 160, that is, four torque values. The torque sensor 130 averages the four torque values to obtain the average torque value V2. For another example, when the crank 160 makes one revolution, the torque sensor 130 records the torque values for every 60° rotation of the crank 160, that is, six torque values. The torque sensor 130 averages the six torque values to obtain the average torque value V2.

It should also be noted that the rotation speed value V1 and the average torque value V2 collectively reflect a riding condition of the user.

In this embodiment, the rotation speed sensor 120 senses the rotation speed value V1 of the chainring 150. That is to say, the rotation speed sensor 120 senses the rotation speed value V1 of the crank 160 or the chainring 150.

In this embodiment, the controller 140 is coupled to the motor 110, the rotation speed sensor 120, and the torque sensor 130. The controller 140 receives the rotation speed value V1 from the rotation speed sensor 120, and receives the average torque value V2 from the torque sensor 130. The controller 140 controls an output of the motor 110 in response to the rotation speed value V1 and the average torque value V2. In this embodiment, the controller 140 provides a control signal CS in response to the rotation speed value V1 and the average torque value V2. The motor 110 provides a corresponding output in respond to the control signal CS. That is to say, based on the control by the controller 140, the motor 110 provides an output corresponding to the riding condition reflected by the rotation speed value V1 and the average torque value V2.

The controller 140 is, for example, a central processing unit (CPU), other programmable general-purpose or special-purpose microprocessors, a digital signal processor (DSP), a programmable controller, an application specific integrated circuit (ASIC), a programmable logic device (PLD), other similar devices, or a combination of these devices, which may load and execute computer programs.

In addition, the driving device 100 controls the output of the motor 110 in response to the rotation speed value V1 and the average torque value V2. The rotation speed value V1 and the average torque value V2 may reflect the riding condition of the user. Therefore, the driving device 100 may control the output of the motor 110 according to the riding condition of the user. In this way, the driving device 100 may provide a more comfortable riding experience in different riding scenarios.

Figure 3:
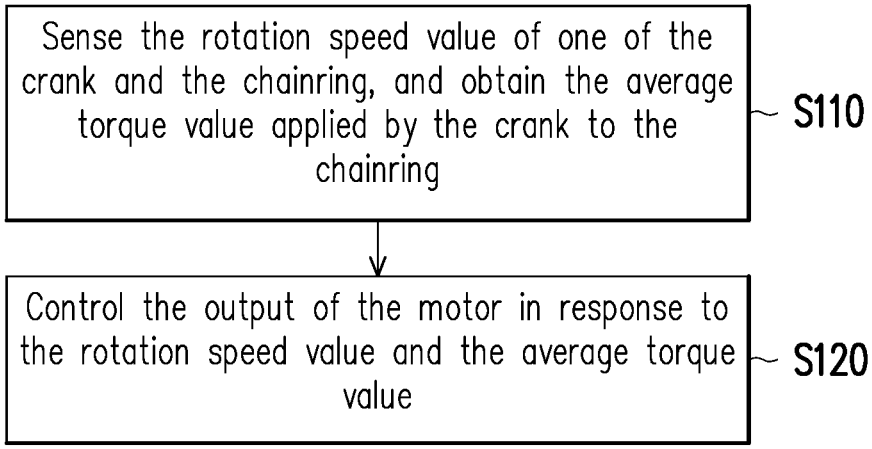
FIG. 3 is a flowchart of a driving method according to an embodiment of the disclosure.

Referring to both FIGS. 1 and 3, FIG. 3 is a flowchart of a driving method according to an embodiment of the disclosure. In step S110 of the driving method in this embodiment, the rotation speed value V1 of one of the crank 160 and the chainring 150 is sensed, and the average torque value V2 applied by the crank 160 to the chainring 150 is obtained. The driving method in this embodiment may be suitable for the driving device 100. In this embodiment, the rotation speed value V1 may be obtained by the rotation speed sensor 120. The average torque value V2 may be obtained by the torque sensor 130. In step S120 of the driving method, the output of the motor 110 is controlled in response to the rotation speed value V1 and the average torque value V2. In this embodiment, step S120 may be performed by the controller 140. Sufficient teachings concerning implementation details of steps S110 and S120 may be gained at least from the embodiments of FIGS. 1 and 2. Therefore, the same details will not be repeated in the following.

Figure 4:
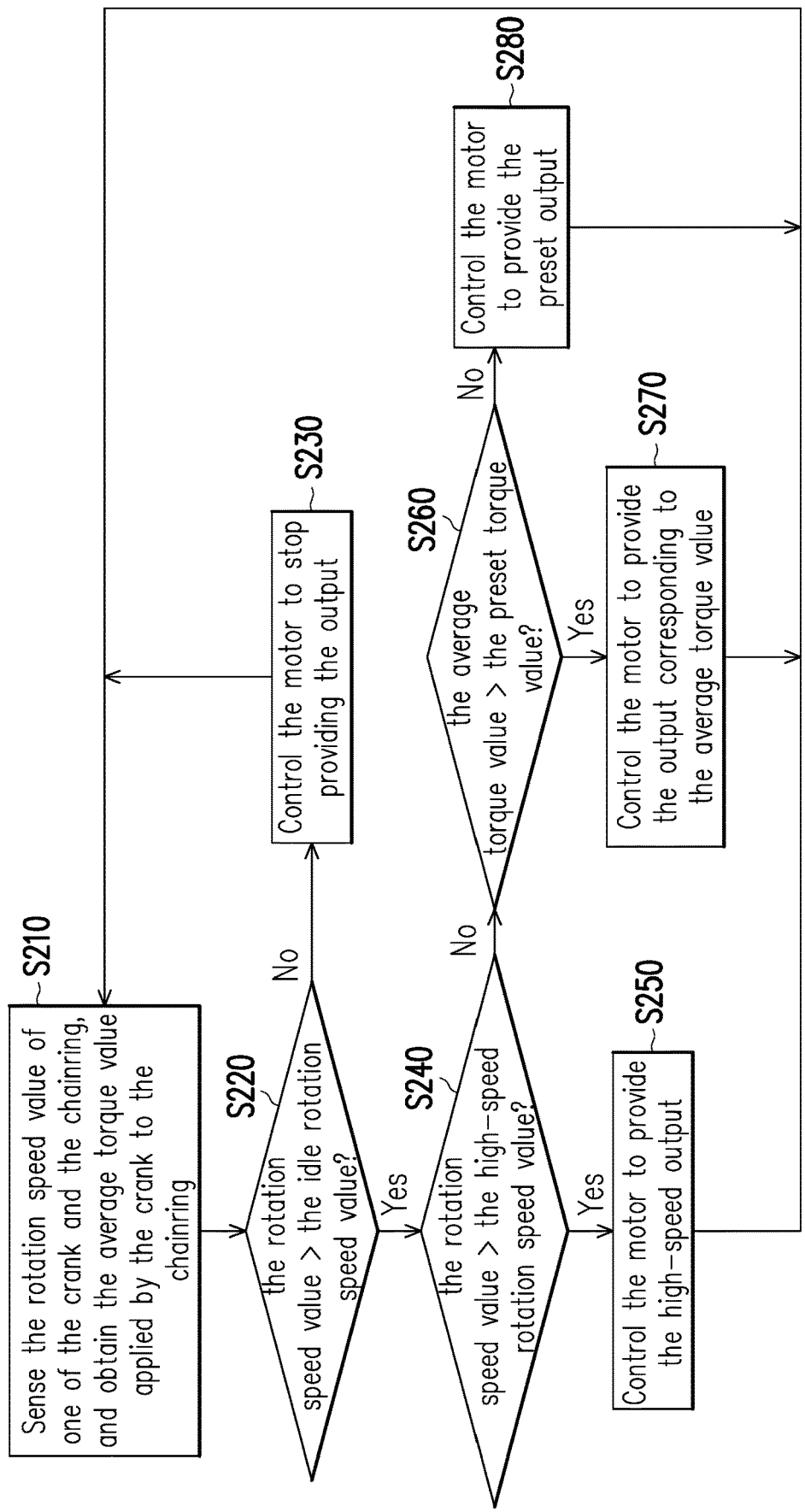
FIG. 4 is a flowchart of another driving method according to an embodiment of the disclosure.

Referring to both FIGS. 1 and 4, FIG. 4 is a flowchart of another driving method according to an embodiment of the disclosure. The driving method in this embodiment may be suitable for the driving device 100. In this embodiment, in step S210 of the driving method, the rotation speed value V1 of one of the crank 160 and the chainring 150 is sensed by the rotation speed sensor 120, and the average torque value V2 applied by the crank 160 to the chainring 150 is obtained by the torque sensor 130. In step S220, the controller 140 determines whether the rotation speed value V1 is greater than an idle rotation speed value. When the rotation speed value V1 is determined to be lower than or equal to the idle rotation speed value, the controller 140 controls the motor 110 to stop the motor 110 from providing the output in step S230. That is to say, the motor 110 does not provide the driving torque in step S230. Specifically, the rotation speed value V1 lower than or equal to the idle rotation speed value (for example, 10 RPM) means that the rotation speed value V1 of the electric assisted bicycle is extremely low. The motor 110 stops providing the output regardless of the average torque value V2. Therefore, for example, when the user steps on the pedal to generate the average torque value V2 under the condition that the electric assisted bicycle is stopped, the motor 110 stops providing the output. In this way, when the electric assisted bicycle is stopped, the driving device 100 may prevent the danger caused by the user stepping on the pedal to make the motor 110 suddenly provide the output. After step S230, the driving method is returned to step S210. In this embodiment, the idle rotation speed value may be modified or set according to actual requirements, and is not limited to 10 RPM in the disclosure.

On the other hand, when the rotation speed value V1 is determined to be higher than the idle rotation speed value in step S220, the controller 140 determines whether the rotation speed value V1 is higher than a high-speed rotation speed value in step S240. When the rotation speed value V1 is determined to be higher than the high-speed rotation speed value, the controller 140 controls the motor 110 according to the rotation speed value V1 in step S250, so that the motor 110 provides a high-speed output. Specifically, the rotation speed value V1 higher than the high-speed rotation speed value (for example, 800 RPM, but the disclosure is not limited thereto) means that the rotation speed value V1 of the electric assisted bicycle is quite high. Therefore, the motor 110 is controlled to provide the high-speed output. In this embodiment, the high-speed rotation speed value may be modified or set according to the actual requirements, and is not limited to 800 RPM in the disclosure.

In this embodiment, the high-speed output is positively correlated to the rotation speed value V1, and is between a full-load output of the motor 110 and a preset percentage (for example, about 50%, that is, a half of the full-load output) of the full-load output of the motor 110. In some embodiments, the high-speed output is proportional to the rotation speed value V1, and is between the full-load output of the motor 110 and the preset percentage of the full-load output of the motor 110. After step S250, the driving method is returned to step S210. In this embodiment, the preset percentage may be modified or set according to the actual requirements, and is not limited to 50% in the disclosure.

In this embodiment, when the rotation speed value V1 is determined to be higher than the idle rotation speed value in, and lower than or equal to the high-speed rotation speed value in step S240, the controller 140 further determines whether the average torque value V2 is higher than a preset torque value in step S260. When the average torque value V2 is determined to be higher than the preset torque value in step S260, the controller 140 controls the motor 110 in step S270, so that the motor 110 provides an output corresponding to the average torque value V2. That is to say, when the rotation speed value V1 is higher than the idle rotation speed value, and lower than or equal to the high-speed rotation speed value, and the average torque value V2 is higher than the preset torque value, the motor 110 is controlled to provide the output corresponding to the average torque value V2 in step S270. For example, in step S270, the output of the motor 110 is positively correlated to the average torque value V2. For another example, in step S270, the output of the motor 110 is proportional to the average torque value V2. After step S270, the driving method is returned to step S210. In this embodiment, the preset torque value may be modified or set according to the actual requirements.

On the other hand, when the average torque value V2 is determined to be less than or equal to the preset torque value in step S260, the controller 140 controls the motor 110 in step S280, so that the motor 110 provides a preset output. That is to say, when the rotation speed value V1 is higher than the idle rotation speed value, and lower than or equal to the high-speed rotation speed value, and the average torque value V2 is less than or equal to the preset torque value, the motor 110 is controlled to provide the preset output in step S280. For example, the preset output is substantially the preset percentage of the full-load output of the motor 110. After step S280, the driving method is returned to step S210.

Figure 5:
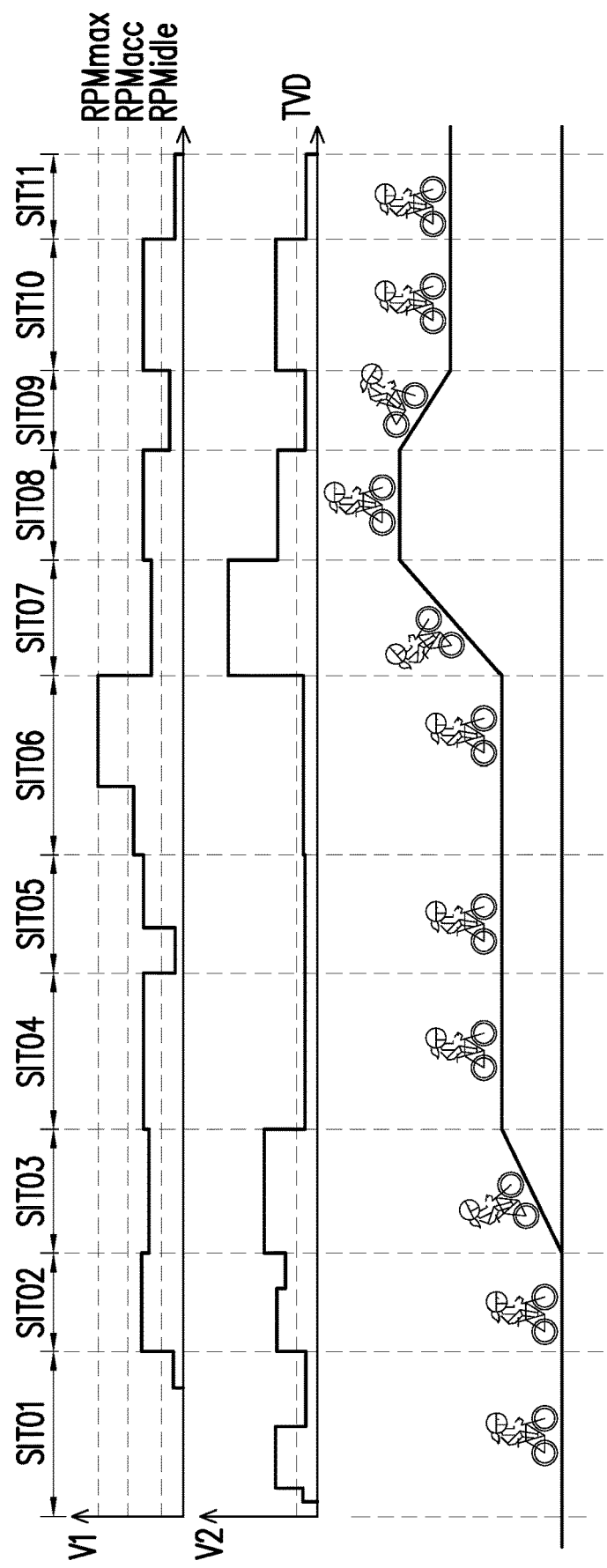
FIG. 5 is a schematic view of a riding scenario according to an embodiment of the disclosure.

Hereinafter, implementation details of the driving device in different riding scenarios are described with examples. Referring to FIGS. 1, 4, and 5 together, FIG. 5 is a schematic view of a riding scenario according to an embodiment of the disclosure. FIG. 5 shows riding scenarios SIT01 to SIT11. First, in the riding scenario SIT01, for example, when the electric assisted bicycle is in a braking state, the rotation speed value V1 is less than an idle rotation speed value RPMidle. Therefore, the controller 140 controls the motor 110 to stop providing the output (step S230) regardless of the average torque value V2.

In a latter stage of the riding scenario SIT01, the user starts to step on the pedal of the electric assisted bicycle, so that the rotation speed value V1 is increased. In the riding scenario SIT02, the rotation speed value V1 is greater than the idle rotation speed value RPMidle, and less than or equal to a high-speed rotation speed value RPMacc. In addition, the average torque value V2 is greater than a preset torque value TVD. Therefore, the controller 140 controls the motor 110 to provide the output corresponding to the average torque value V2 (step S270).

In the riding scenario SIT03, when the electric assisted bicycle is traveling on an uphill section, the rotation speed value V1 decreases, but the rotation speed value V1 is still greater than the idle rotation speed value RPMidle, and less than or equal to the high-speed rotation speed value RPMacc. In addition, the average torque value V2 increases, but the average torque value V2 is still greater than the preset torque value TVD. Therefore, the motor 110 still provides the output corresponding to the average torque value V2 (step S270). In the riding scenarios SIT02 and SIT03, the output provided by the motor 110 corresponds to the pedaling force of the user.

In the riding scenario SIT04, when the electric assisted bicycle is traveling on a flat road section, the user reduces the pedaling force, so that the average torque value V2 is less than the preset torque value TVD, but the rotation speed value V1 is still greater than the idle rotation speed value RPMidle. Therefore, the controller 140 controls the motor 110 to provide the preset output (step S280). The preset output may be, for example, the preset percentage of the full-load output of the motor 110.

In a former stage of the riding scenario SIT05, the user stops the electric assisted bicycle. The rotation speed value V1 is less than the idle rotation speed value RPMidle. The average torque value V2 is less than the preset torque value TVD. Therefore, the controller 140 stops the motor 110 from providing the output (step S230). In a latter stage of the riding scenario SIT05, the user steps on the pedal lightly. Although the average torque value V2 is less than the preset torque value TVD, the rotation speed value V1 is greater than the idle rotation speed value RPMidle, and less than or equal to the high-speed rotation speed value RPMacc. Therefore, the controller 140 controls the motor 110 to provide the preset output (step S280).

In a former stage of the riding scenario SIT06, the motor 110 still provides the preset output (step S280). In a latter stage of the riding situation SIT06, the rotation speed value V1 is greater than the high-speed rotation speed value RPMacc. Therefore, the motor 110 provides the high-speed output (step S250). That is to say, regardless of whether the average torque value V2 is higher than the preset torque value TVD (with the average torque value V2 less than the preset torque value TVD as an example in the figure), the motor 110 provides the high-speed output. The high-speed output is positively correlated to the rotation speed value V1, and is between the full-load output of the motor 110 and the preset percentage of the full-load output of the motor 110. In this embodiment, the full-load output of the motor 110 may, for example, correspond to a maximum rotation speed value RPMmax of the electric assisted bicycle. In some embodiments, the full-load output of the motor 110 may be, for example, an output corresponding to a rated speed of the electric assisted bicycle. In some embodiments, the output corresponding to the rated speed corresponds to the maximum rotation speed value RPMmax.

In the riding scenario SIT07, the electric assisted bicycle is traveling on the uphill section. The rotation speed value V1 is greater than the idle rotation speed value RPMidle, and less than or equal to the high-speed rotation speed value RPMacc. The user significantly increases the pedaling force, so that the average torque value V2 is greater than the preset torque value TVD. Therefore, the controller 140 controls the motor 110 to provide the output corresponding to the average torque value V2 (step S270).

In the riding scenario SIT08, the electric assisted bicycle is traveling on the flat road section. The user reduces the pedaling force, but the average torque value V2 is still greater than the preset torque value TVD. Therefore, the controller 140 controls the motor 110 to provide the output corresponding to the average torque value V2 (step S270).

In the riding scenario SIT09, the electric assisted bicycle is traveling on a downhill section. The electric assisted bicycle starts to slide. The user does not step on the pedal, so that the rotation speed value V1 is less than the idle rotation speed value RPMidle, and the average torque value V2 is less than the preset torque value TVD. Therefore, the controller 140 controls the motor 110 to stop providing the output (step S230).

In the riding scenario SIT10, the electric assisted bicycle is traveling on the flat road section. The riding scenario SIT10 is similar to the example in the riding scenario SIT02. The controller 140 controls the motor 110 to provide the output corresponding to the average torque value V2 (step S270).

In the riding scenario SIT11, the user stops the electric assisted bicycle. Therefore, the controller 140 stops the motor 110 from providing the output (step S230).

It is clear that the driving device 100 may control the output of the motor 110 in accordance with an operation by the user in the riding scenarios SIT01 to SIT11. The rotation speed value V1 and the average torque value V2 reflects the riding operation by the user in the different riding scenarios. Therefore, the driving device 100 may provide a more comfortable riding experience in the different riding scenarios.

Based on the above, the driving device and the driving method in the disclosure control the output of the motor in response to the rotation speed value and the average torque value of the chainring or the crank. The rotation speed value and the average torque value reflects the riding operation by the user in the different riding scenarios. In this way, the driving device and the driving method in the disclosure may meet the riding requirements of the user in the different riding scenarios, thereby providing a more comfortable riding experience.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A driving device for an electric assisted bicycle, comprising:
   a motor configured to provide a driving torque required by the electric assisted bicycle to move forward;
   a rotation speed sensor configured to sense a rotation speed value of one of a crank and a chainring of the electric assisted bicycle;
   a torque sensor configured to obtain an average torque value applied by the crank to the chainring of the electric assisted bicycle; and
   a controller coupled to the motor, the rotation speed sensor, and the torque sensor, and configured to control an output of the motor in response to the rotation speed value and the average torque value,
   wherein when the rotation speed value is higher than an idle rotation speed value, and lower than or equal to a high-speed rotation speed value, and the average torque value is greater than a preset torque value, the controller controls the motor to provide an output corresponding to the average torque value.

2. The driving device according to claim 1, wherein when the rotation speed value is lower than or equal to the idle rotation speed value, the controller controls the motor to stop providing the output of the motor.

3. The driving device according to claim 1, wherein when the rotation speed value is higher than the high-speed rotation speed value, the controller controls the motor to provide a high-speed output according to the rotation speed value.

4. The driving device according to claim 3, wherein the high-speed output is positively correlated to the rotation speed value, and is between a full-load output of the motor and a preset percentage of the full-load output of the motor.

5. The driving device according to claim 1, wherein when the rotation speed value is higher than the idle rotation speed value, and lower than or equal to the high-speed rotation speed value, and the average torque value is less than or equal to a preset torque value, the controller controls the motor to provide a preset output.

6. The driving device according to claim 5, wherein the preset output is substantially equal to a preset percentage of a full-load output of the motor.

7. The driving device according to claim 1, wherein the torque sensor senses a plurality of torque values when the crank makes one revolution, and averages the plurality of torque values to obtain the average torque value.

8. A driving method for an electric assisted bicycle, wherein the electric assisted bicycle comprises a chainring, a crank, and a motor, and the driving method comprises:
   sensing a rotation speed value of one of the crank and the chainring by a rotation speed sensor, and obtaining an average torque value applied by the crank to the chainring by a torque sensor; and
   controlling an output of the motor in response to the rotation speed value and the average torque value,
   wherein controlling the output of the motor in response to the rotation speed value and the average torque value comprises:
   when the rotation speed value is higher than an idle rotation speed value, and lower than or equal to a high-speed rotation speed value, and the average torque value is greater than a preset torque value, controlling the motor to provide an output corresponding to the average torque value.

9. The driving method according to claim 8, further comprising:
   when the rotation speed value is lower than or equal to the idle rotation speed value, controlling the motor to stop providing the output of the motor regardless of the average torque value.

10. The driving method according to claim 8, further comprising:
    when the rotation speed value is higher than the high-speed rotation speed value, controlling the motor to provide a high-speed output according to the rotation speed value.

11. The driving method according to claim 10, wherein the high-speed output is positively correlated to the rotation speed value, and is between a full-load output of the motor and a preset percentage of the full-load output of the motor.

12. The driving method according to claim 8, wherein controlling the output of the motor in response to the rotation speed value and the average torque value comprises:
    when the rotation speed value is higher than the idle rotation speed value, and lower than or equal to the high-speed rotation speed value, and the average torque value is less than or equal to a preset torque value, controlling the motor to provide a preset output.

13. The driving device according to claim 12, wherein the preset output is substantially equal to a preset percentage of a full-load output of the motor.

14. The driving method according to claim 8, wherein obtaining the average torque value applied by the crank to the chainring comprises:
    sensing a plurality of torque values when the crank makes one revolution; and
    averaging the plurality of torque values to obtain the average torque value.

* * * * *